United States Patent
Brooks et al.

(10) Patent No.: US 6,985,849 B1
(45) Date of Patent: Jan. 10, 2006

(54) SYSTEM AND METHOD FOR PORTABLE EMULATION OF OPERATING ENVIRONMENT

(75) Inventors: Neal Brooks, Alto, TX (US); Scott Hillyard, Nibley, UT (US); Todd Marcusen, South Ogden, UT (US); James Rhodes, Nacogdoches, TX (US); Michael Sexton, Roy, UT (US); Robert Sinclair, Madison, UT (US)

(73) Assignee: Iomega Corporation, San Diego, CA (US)

( * ) Notice: Subject to any disclaimer, the term of this patent is extended or adjusted under 35 U.S.C. 154(b) by 375 days.

(21) Appl. No.: 09/808,351

(22) Filed: Mar. 15, 2001

(51) Int. Cl.
G06F 9/455 (2006.01)

(52) U.S. Cl. ...................................... 703/26
(58) Field of Classification Search ................. 703/26
See application file for complete search history.

(56) References Cited

U.S. PATENT DOCUMENTS

| 4,899,136 A | * | 2/1990 | Beard et al. ............... 345/156 |
| 5,065,262 A | * | 11/1991 | Blackborow et al. ......... 360/75 |
| 5,732,266 A | * | 3/1998 | Moore et al. ................. 713/1 |
| 5,734,831 A | * | 3/1998 | Sanders ..................... 709/223 |
| 6,182,212 B1 | * | 1/2001 | Atkins et al. ................ 713/1 |
| 6,269,409 B1 | * | 7/2001 | Solomon .................... 719/329 |
| 6,615,365 B1 | * | 9/2003 | Jenevein et al. .............. 714/6 |
| 6,633,977 B1 | * | 10/2003 | Hamilton et al. ........... 713/100 |
| 6,772,419 B1 | * | 8/2004 | Sekiguchi et al. .......... 719/319 |

* cited by examiner

Primary Examiner—Paul L. Rodriguez
Assistant Examiner—Dwin M. Craig
(74) Attorney, Agent, or Firm—James T. Hagler

(57) ABSTRACT

The invention embeds an emulation module in removable media, for use in replicating an operating environment on a laptop or other remote machines. The emulation module prompts the user to capture environmental settings on an originating machine, such as display settings, network settings, input/output, applications, working data files and other parameters on a removable media. The user may then insert the removable media in a compatible reader attached to the laptop or other secondary or host machine, and upon activation of the emulation module reproduce the screen display, applications, data files and other resources on the host machine. When the user is finished working on the host machine, the emulation module may restore the settings of the operating environment on that machine to their preexisting state. Working data may be synchronized between the originating and host machines.

3 Claims, 3 Drawing Sheets

SYSTEM AND METHOD FOR PORTABLE EMULATION OF OPERATING ENVIRONMENT

CROSS-REFERENCE TO RELATED APPLICATIONS

The subject matter of this application is related to the subject matter of U.S. application Ser. No. 09/360,337 filed Jul. 26, 1999, entitled "Self Contained Application Disk for Automatically Launching Application Software or Starting Devices and Peripherals", assigned or under duty of assignment to the same entity as this application, and which application is incorporated herein by reference.

FIELD OF THE INVENTION

The invention relates to the field of computer software, and more particularly to replication of desktop settings, file structures and other aspects of a computer operating environment from a primary computer or other client to a notebook computer or other portable device via removable media.

BACKGROUND OF THE INVENTION

The advent of the Internet as well as network operating systems such as Novell Netware™ and Microsoft Windows NT™ and 2000 have encouraged users to become more mobile in their computing habits. Many business people have or make use of a primary desktop computer and a portable computer or other device for email, word processing, spreadsheet and other purposes while traveling. Home users increasingly may use both stationary desktop and laptop-class devices as well. Often, the primary and portable computers may share the same or similar operating system or environment, so that the user may work on the same data files and use the same or compatible applications, both at the office or home and on the road.

While the sharing of data and also the application suite between primary and host or secondary machines is a widespread practice, there is as yet no way in which the operating environment itself may be mirrored between the two platforms via removable media. For instance, a person's office computer may run on the Windows™ 2000 operating system, their laptop may run on the Windows™ 95 platform. When switching from one environment to the other, the application suite may run compatibly on both machines, but the desktop and other environmental variables presented to the user on each may be different.

For instance, the desktop pixel size, color depth, wallpaper, icon set, font settings, task bar placement, mouse settings, screen savers, power options, keyboard settings, time settings, files and directory structure, network settings, password settings, printer settings, audio defaults, browser settings, file associations, backup settings, other system or application settings and other environmental variables may differ on a desktop and portable machine. While some of those environmental settings may not affect the operation of applications or ability to access and save data files, the lack of consistency between machines may hinder other functions, such as ability to print, dial up or otherwise access the Internet or other network resources, scan for disk integrity or other functions. Any attempt to reconcile these parameters when traveling must now be done manually by the user, which is a tedious and error-prone process, or both machines must be directly connected via cabling or other techniques to image one drive to another. Other drawbacks exist.

SUMMARY OF THE INVENTION

The invention overcoming these and other drawbacks in the art relates to a system and method for portable emulation of an operating environment which in one regard permits a user to load a removable media such as an Iomega Zip™, Jaz™, or Peerless™ or other drive on an originating machine, selectively load environmental variables on the media, and insert the media into a portable or other host or secondary machine to activate an emulation module. The emulation module may execute on the host or secondary machine to read and deploy the stored environmental variables, such as desktop pixel size, color depth, wallpaper, icon set, font settings, task bar placement, mouse settings, screen savers, power options, keyboard settings, time settings, files and directory structure, network settings, printer settings, audio defaults, browser settings, file associations, backup settings, other settings or application settings and other environmental variables on the host or secondary machine.

When the user has completed and saved their work on the host or secondary machine, the media may be removed and the temporary environmental settings may be returned to the existing defaults on the portable or other host or secondary machine. A synchronizer module may conform application data sets on both the originating and host machines.

BRIEF DESCRIPTION OF THE DRAWINGS

The invention will be described with reference to the accompanying drawings, in which like elements are referenced with like numerals.

DETAILED DESCRIPTION OF PREFERRED EMBODIMENTS

Figure 1:
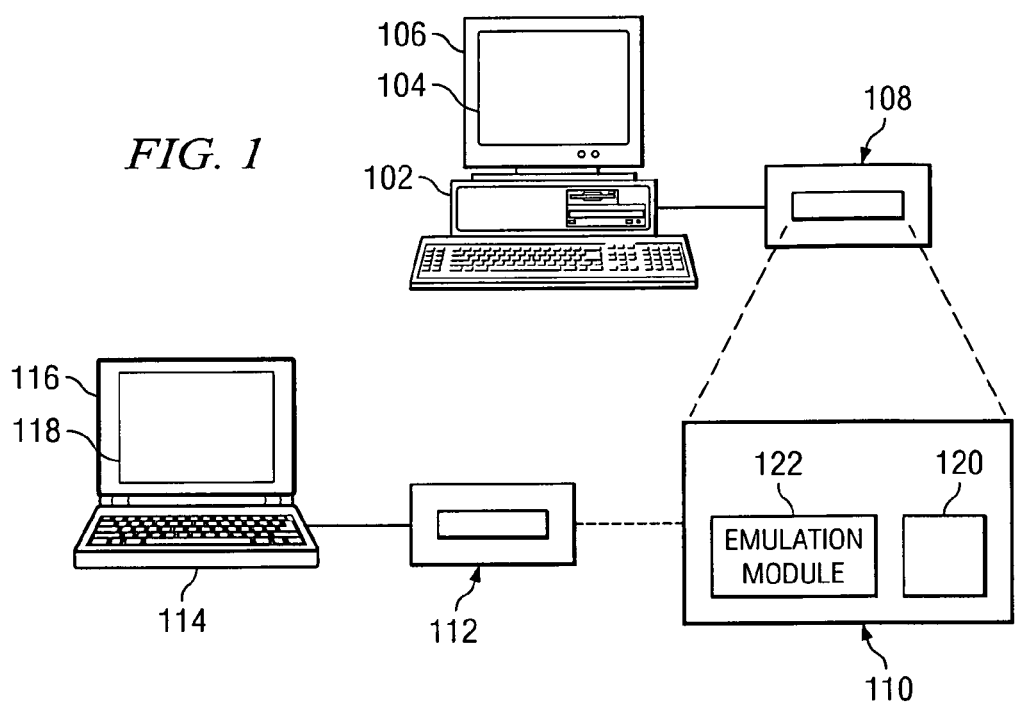
FIG. 1 illustrates the emulation of an originating machine on a host machine via removable media according to one embodiment of the invention.

As illustrated in FIG. 1, according to an embodiment of the invention an originating machine 102 may be equipped with a media reader 108 to read and write to removable media 110. The removable media 110 may be or include, for instance, an Iomega an Iomega Zip™, Jaz™, or Peerless™ disk, a rewritable CD ROM (CDRW) disk, a floppy disk or other magnetic, optical, solid state or other media.

The originating machine 102 may be or include, for instance, a desktop computer running the Microsoft Windows™ 95, 98, Millenium™, NT™, or 2000 Windows™ CE™, PalmOS™, Unix, Linux, Solaris™, OS/2™, BeOS™, MacOS™ or other operating system or platform. Originating machine 102 may include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control. Originating machine 102 may furthermore include electronic memory such as RAM (random access memory) or EPROM (electronically programmable read only memory), storage such as a hard drive, CDROM or other magnetic, optical or other media, and other associated components connected over an electronic bus, as will be appreciated by persons skilled in the art.

Originating machine 102 may also be or include a network-enabled appliance such as a WebTV™ unit, radio-enabled Palm™ Pilot or similar unit, a set-top box, a networkable game-playing console such as Sony Playstation™ or Sega Dreamcast™, a browser-equipped or other network-enabled cellular telephone, or other TCP/IP client or other device.

The originating machine 102 may include a display device 106 such as a cathode ray tube or liquid crystal display, upon which an operating environment 104 may be presented. The operating environment 104 may include, for instance, a graphical user interface (GUI) depicting the state of the machine, its file and other storage, applications and execution state, and other elements or resources. The operating environment 104 may furthermore include desktop pixel size, color depth, wallpaper, icon set, font settings, task bar placement, mouse settings, screen savers, power options, keyboard settings, time settings, files and directory structure, network settings, password settings, printer settings, audio defaults, browser settings, file associations, backup settings and other variables.

Elements of the operating environment 104 may be selectable by a user via an operating system setting, command or resource such as via a Windows™ Registry entry, a Windows™ initiation (.INI) file, a Windows™ autoexecution (Autoexec) file, a Windows™ configuration (Config) file, a UNIX "setenv" or "unsetenv" command or other parameters.

According to the invention, an executable emulation module 122 may be embedded on the removable media 110 for use in replicating the operating environment of originating machine 102 to the host machine 114. The emulation module 122 may be configured to autorun upon insertion of the removable medial 110 into the media reader 108, or in another embodiment be configured to execute when activated by the user or otherwise.

Figure 2:
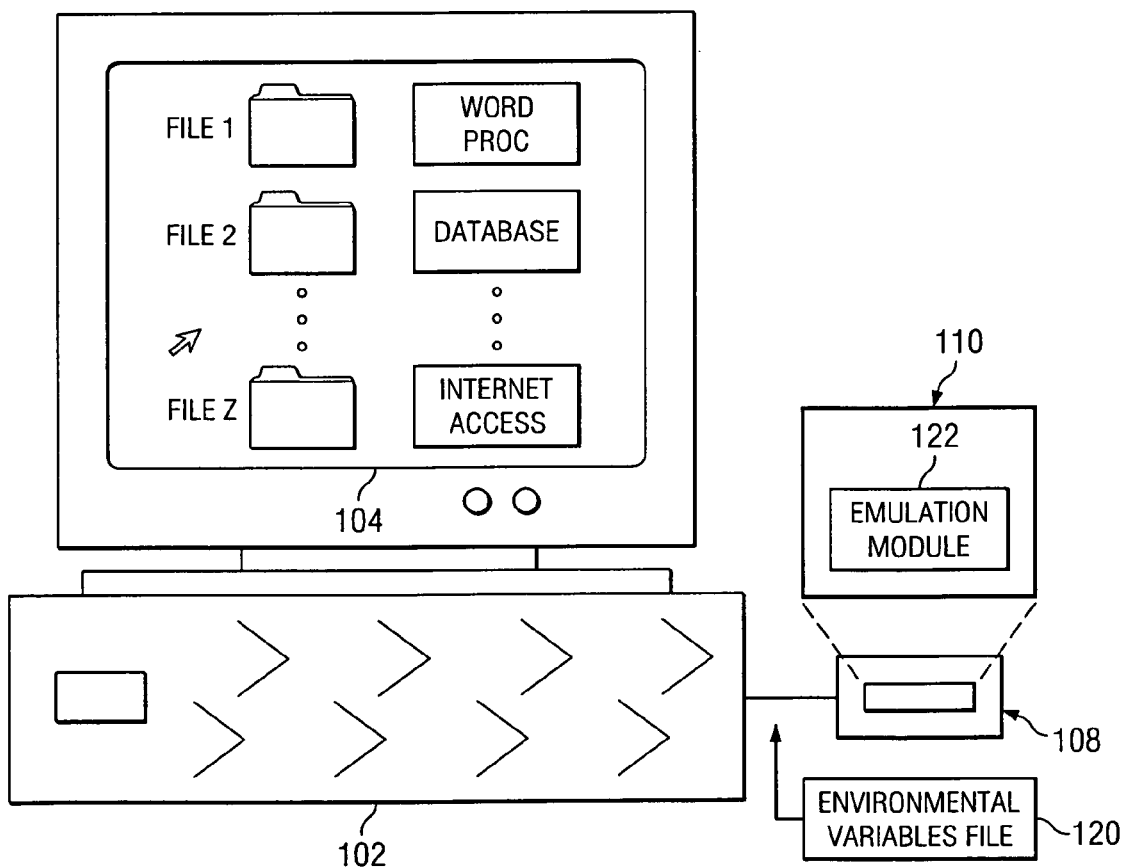
FIG. 2 illustrates mechanisms of the emulation module operating to secure the environmental variables of the originating machine via removable media according to an embodiment of the invention.

As illustrated for instance in FIG. 2, when activated, the emulation module 122 may present the user with selections on display 106 to capture desired portions of the operating environment 104 and reproduce those features on another machine. For example, the user may be queried whether they wish to store display characteristics and other aspects of the originating machine 102 for replication. Those elements and resources may include, for example desktop pixel size, color depth, wallpaper, icon set, font settings, task bar placement, mouse settings, screen savers, power options, keyboard settings, time settings, files and directory structure, network settings, password settings, printer settings, audio defaults, browser settings, file associations, backup settings and other variables.

A user may select one, some or all of the available settings from operating environment 104 for capture on removable media 110. A user may also select desired data files, data directories or other data resources to replicate via removable media 110, for instance word processing files for remote editing or others. The emulation module 122 may record the selected aspects of the operating environment 104 and desired data in environmental variables file 120 on removable media 110.

Once a user has selected all desired characteristics from operating environment 104 and identified desired data for transport, the emulation module 122 may be terminated and the removable media 110 removed from media reader 108.

Figure 3:
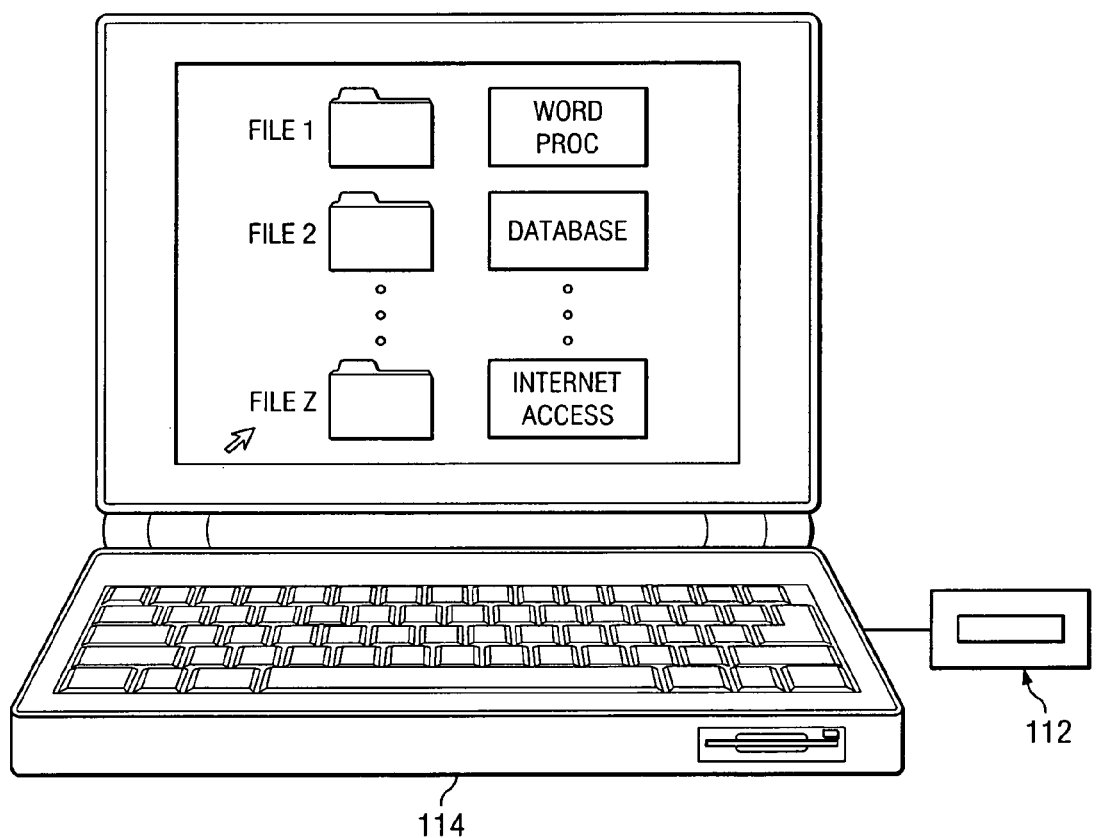
FIG. 3 illustrates deployment of the removable media in the host machine according to an embodiment of the invention to transform the environment of that machine.

As illustrated in FIG. 1, the removable media 110 may then be taken by the user for use in the host machine 114 or other client for use. The host machine 114 may be, for instance, a device or client similar to originating machine 102, and may illustratively be a laptop or notebook computer, a network-enabled cellular telephone or other stationary, mobile or other device. As illustrated in FIG. 3, the host machine 114 may be equipped with a media reader 112, also compatible with the removable media 110 for reading, writing and other file and other operations.

Figure 4:
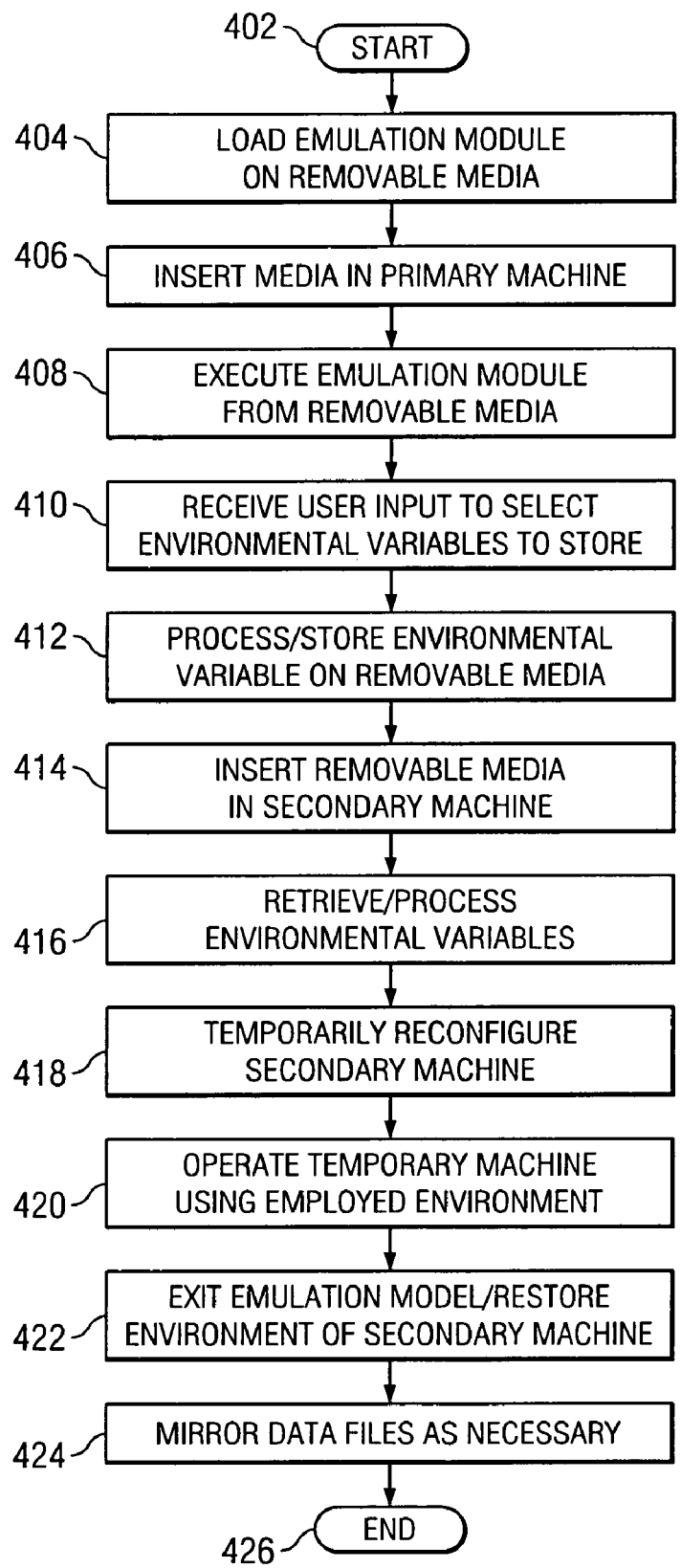
FIG. 4 illustrates a flowchart for overall replication processing according to an embodiment of the invention.

Overall processing according to an embodiment of the invention is illustrated in FIG. 4. In step 402, processing begins. In step 404, the emulation module 122 may be loaded on removable media 110, for instance at time of manufacture, via an Internet download, or otherwise. In step 406, the removable media 110 may be inserted in the media reader 108 attached to the originating machine 102. In step 408, the emulation module 122 may be executed from the removable media 110, for instance by autorun or by user prompt. In step 410, the user may be queried to select the desired features of operating environment 104 and working data which they wish to replicate, and the user's input may be received to identify those elements to store on removable media 110. In step 412, the selected resources may be processed and stored in environmental variables file 120 on removable media 110.

In step 414, the user may retrieve the removable media 110 and insert the removable media 110 in the media reader 112 of the host machine 114. In step 416, the emulation module 122 may execute on host machine 114 to retrieve and process the environmental variables file 120 from removable media 110. In step 418, the emulation module 122 may trap and reconcile any incompatibilities between the captured portions of the operating environment 104 of the originating machine 102 and the host machine 114. For instance, if the captured screen size or color depth is not available on host machine 114, the emulation module may select a nearest match for that variable to reconcile the mirrored environment with the original resources. Other solutions may be used.

In step 420, the emulation module 122 may temporarily reconfigure the operating environment of the host machine 114 to emulate the operating environment 104 of the primacy machine 102, for instance by adjusting Windows™ Registry settings, control panel settings or using other system resources. In step 422, the host machine 114 may be operated by the user in an emulation of the operating environment 104 of the originating machine 102. For instance, working data may be accessed and updated using word processing, database or other applications on a desktop whose appearance mirrors that of the originating machine 102.

In step 424, the user may exit the emulation mode on host machine 114 by terminating emulation module 122, as part of which emulation module 122 may restore all parameters of the operating environment of the host machine 114 to their preexisting values. In step 426, if data files have been updated during the emulation session and the user so selects, the data files located on removable media 110 may be synchronized with those on primacy machine 102, for instance upon reinsertion of the removable media 110 in the media reader 108 of the originating machine 102. In step 428, processing ends.

The foregoing description of the system and method of the invention is illustrative, and variations in configuration and implementation will occur to persons skilled in the art. For instance, while the invention has generally been described in terms of a single originating machine whose environmental variables may be recorded for emulation on a single portable or other host machine, more than one secondary machine may receive the emulation data from the removable media to simulate that machine. More than one originating machine environment could also be stored on a given removable media.

Similarly, while the invention has generally been described in terms of an originating machine consisting of a stationary desktop machine whose environment is emulated on a portable secondary or host machine, the originating machine could be a laptop or other portable computer, a network-enabled cellular telephone or other client device, while the host machine could likewise be a desktop computer or other client device.

The scope of the invention is accordingly intended to be limited only by the following claims.

What is claimed:

1. A method for emulating an operating environment via removable media, comprising:
   storing a set of operating environmental variables defining a first operating environment from a first machine on the removable media;
   connecting a second machine to the removable media;
   modifying a second operating environment of the second machine based on the stored operating environmental variables so the modified operating environment of the second machine emulates the first operating environment of the first machine independent of the operation of the first machine;
   terminating the emulation; and
   restoring the second operating environment of the second machine upon termination of the emulation.

2. The method of claim 1, further comprising automatically modifying the second operating environment upon connection of the second machine to the removable media.

3. A method for emulating an operating environment via removable media, comprising:
   storing a set of operating environmental variables defining a first operating environment from a first machine on the removable media;
   connecting a second machine to the removable media;
   modifying a second operating environment of the second machine based on the stored operating environmental variables so the modified operating environment of the second machine emulates the first operating environment of the first machine independent of the operation of the first machine;
   terminating the emulation;
   restoring the second operating environment of the second machine upon termination of the emulation;
   connecting the removable media to the first machine; and
   automatically synchronizing data between the removable media and the first machine.

* * * * *